(12) United States Patent
Kang et al.

(10) Patent No.: US 7,820,908 B2
(45) Date of Patent: Oct. 26, 2010

(54) SOLID STATE DYE-SENSITIZED SOLAR CELL EMPLOYING COMPOSITE POLYMER ELECTROLYTE

(75) Inventors: Moon Sung Kang, Seoul (KR); Jong Hak Kim, Seoul (KR); Young Jin Kim, Seoul (KR); Jongok Won, Seoul (KR); Yong Soo Kang, Seoul (KR); Hoon Sik Kim, Seoul (KR)

(73) Assignee: Korea Institute of Science and Technology (KR)

( * ) Notice: Subject to any disclaimer, the term of this patent is extended or adjusted under 35 U.S.C. 154(b) by 1072 days.

(21) Appl. No.: 10/948,833

(22) Filed: Sep. 22, 2004

(65) Prior Publication Data

US 2005/0072462 A1    Apr. 7, 2005

(30) Foreign Application Priority Data

Oct. 1, 2003    (KR) .................... 10-2003-0068269

(51) Int. Cl.
    *H01L 31/00*    (2006.01)
(52) U.S. Cl. ...................................... 136/263
(58) Field of Classification Search .......... 136/252, 136/256, 263, 293; 429/111; 252/62
See application file for complete search history.

(56) References Cited

U.S. PATENT DOCUMENTS

| | | | | |
|---|---|---|---|---|
| 3,637,375 | A * | 1/1972 | Levinos ...................... | 430/188 |
| 5,451,454 | A * | 9/1995 | Fukahori et al. ........... | 428/318.4 |
| 5,604,626 | A * | 2/1997 | Teowee et al. ............. | 359/265 |
| 6,159,389 | A * | 12/2000 | Miura et al. ................ | 252/62.2 |
| 6,278,056 | B1 * | 8/2001 | Sugihara et al. ........... | 136/263 |
| 2002/0134426 | A1 * | 9/2002 | Chiba et al. ................ | 136/263 |
| 2003/0013008 | A1 * | 1/2003 | Ono .......................... | 429/111 |
| 2003/0192584 | A1 * | 10/2003 | Beckenbaugh et al. .... | 136/256 |
| 2008/0163925 | A1 * | 7/2008 | Sohn et al. ................. | 136/252 |

FOREIGN PATENT DOCUMENTS

JP    62139266 A  *  6/1987  .................. 429/33

OTHER PUBLICATIONS

Yaws, Carl, Yaws's Handbook of Thermodynamic and Physical Properties of Chemical Compounds, Knovel, 2003.*
T. Stergiopoulos, I Arabatzis, G. Katsaros and P. Falaras, Binary polyethylene oxide/titania solid state redox eletrolyte for highly efficient nanocrystalline TiO2 photoelectrochemical cells, 2002, ACS, Nano Letters, 2 (11), 1259-12-61.*

* cited by examiner

*Primary Examiner*—Alexa D. Neckel
*Assistant Examiner*—Miriam Berdichevsky
(74) *Attorney, Agent, or Firm*—NSIP Law (57) ABSTRACT

Disclosed is a solid state dye-sensitized solar cell employing a composite polymer electrolyte, which includes a photoelectrode, a counter electrode, and an electrolyte interposed between the photoelectrode and counter electrode. The electrolyte includes at least one of a middle molecular substance, a polymer mixture, and inorganic nanoparticles, and a redox derivative. The dye-sensitized solar cell reduces crystallinity of the polymer electrolyte to significantly increase ionic conductivity, and enables the polymer electrolyte to smoothly permeate into a titanium oxide layer to improve mechanical properties, thereby significantly increasing energy conversion efficiency. Accordingly, the dye-sensitized solar cell assures high energy conversion efficiency without an electrolyte leak, and thus, it can be stably and practically used for a long time.

17 Claims, 3 Drawing Sheets

SOLID STATE DYE-SENSITIZED SOLAR CELL EMPLOYING COMPOSITE POLYMER ELECTROLYTE

BACKGROUND OF THE INVENTION

1. Field of the Invention

The present invention relates, in general, to a solid state dye-sensitized solar cell employing a composite polymer electrolyte and, more particularly, to a solid state dye-sensitized solar cell employing a composite polymer electrolyte, which includes a photoelectrode, a counter electrode, and an electrolyte sandwiched between the photoelectrode and counter electrode, and in which the composite polymer electrolyte includes one selected from the group consisting of middle molecular substances, or the mixtures of the middle molecular substances and polymer, and the mixtures of the middle molecular substances and inorganic nanoparticles, and redox couples. Here the photoelectrode includes transparent conducting layer, semi-conducting nanoporous layer and dye photosensitizer.

2. Description of the Prior Art

A solar cell, which is capable of generating electricity without emitting a pollutant, thereby providing noteworthy solutions for the protection of environment and energy problems, is being watched with interest due to the exhaustion of fossil fuels and policies restricting carbon dioxide emissions.

Figure 1:
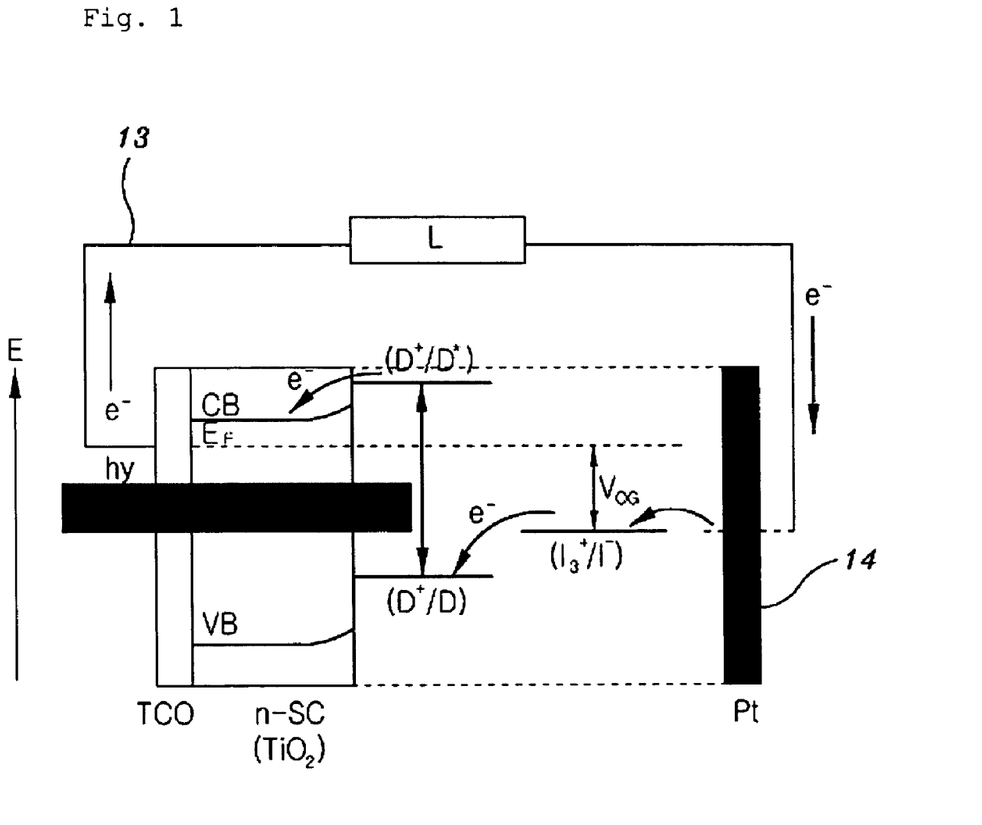
FIG. 1 illustrates an operation of a conventional dye-sensitized solar cell.

FIG. 1 illustrates operation of a conventional dye-sensitized solar cell. As shown in FIG. 1, when sunlight is irradiated to an n-type nanoparticle semiconductor oxide electrode 11 which includes dye molecules (not shown) chemically adsorbed onto a surface thereof, an electronic transition of the dye molecules from a ground state ($D^+/D$) into an excited state ($D^+/D^*$) is initiated to form a pair of electron holes, and electrons in the excited state are introduced into a conduction band (CB) of semiconductor nanoparticles. The electrons, introduced into the semiconductor oxide electrode 11, are transferred through interfaces between the particles into a transparent conducting oxide (TCO) 12 which is in contact with the semiconductor oxide electrode 11, and then moved through an external wire 13, connected to the transparent conducting oxide 12, to a counter electrode 14. A redox electrolyte 15 is introduced between the counter electrode 14 and the semiconductor oxide electrode 11, and a load is connected to the transparent conducting oxide 12 and counter electrode 14 in series to measure a short-circuit current, an open-circuit voltage, and a fill factor, thereby evaluating efficiency of the solar cell.

The dye molecules ($D^+D^*$), which are oxidized due to the electronic transition caused by the light absorption, receive electrons ($e^-$), generated by oxidation of iodine ions ($I_3^-/I^-$), in the redox electrolyte to be reduced, and $I^-$ ions are reduced by electrons ($e^-$), reaching the counter electrode, thereby completing the operation of the dye-sensitized solar cell. A photocurrent is caused by diffusion of the electrons introduced into the semiconductor electrode, and a photovoltage ($V_{oc}$) is determined by a difference between Fermi energy ($E_F$) of the semiconductor oxide and a redox potential of the electrolyte.

A representative example of conventional dye-sensitized solar cells is a solar cell known in 1991 by Grätzel et al. in Switzerland (U.S. Pat. Nos. 4,927,721 and 5,350,644). The solar cell suggested by Grätzel et al. is a photo-electrochemical solar cell employing an oxide semiconductor, which includes photosensitive dye molecules and titanium dioxide nanoparticles, and has an advantage of lower production costs than a conventional silicone solar cell. A conventional dye-sensitized nanoparticle oxide solar cell includes a nanoparticle oxide semiconductor cathode, a platinum anode, a dye coated on the cathode, and a redox liquid electrolyte employing an organic solvent. However, when an external temperature of the dye-sensitized solar cell, including the liquid electrolyte produced using the organic solvent, is increased due to sunlight, the solvent of the electrolyte is likely to become volatilized. Accordingly, use of the solar cell in long-term stable and commercial applications is very unsuitable because of a solvent leak.

An initial effort was made to develop a solar cell, which employs a solvent-free solid polymer electrolyte in 2001 by De Paoli et al. in Brazil (A. F. Nogueira, J. R. Durrant, M. A. De Paoli, Adv. Mater. 13, 826, 2001). They have created a polymer electrolyte, which includes a copolymer of poly(epichlorohydrin) and ethylene oxide, and a redox derivative ($NaI/I_2$). Energy conversion efficiency of the solar cell is 2.6% at 10 mW/cm$^2$ and 1.6% at 100 mW/cm$^2$.

Another example is a study, which was conducted in 2002 by Falars et al. in Greece (T. Stergiopoulos, I. M. Arabatiz, G. Katsaros, P. Falars, Nano Letters 2, 1259, 2002), in which semiconductor nanoparticles are added to polyethylene oxide, having high crystallinity, to reduce the crystallinity of the polymer and to improve mobilities of redox moieties. In this regard, significant reduction of a crystal of polyethylene oxide is confirmed using a differential scanning calorimetry (DSC) and an atomic force microscopy (AFM). Hence, ionic conductivity is increased to $10^{-5}$ S/cm at room temperature. Additionally, a solar cell has an open-circuit voltage ($V_{oc}$) of 0.664 V, a short-circuit current ($J_{sc}$) of 7.2 mA/cm$^2$, a fill factor of 0.58, and energy conversion efficiency ($\eta$) of 4.2% at 65.6 mW/cm$^2$.

However, the solar cell employing the polymer electrolyte is disadvantageous in that its commercialization is impossible because of poor energy conversion efficiency. Other disadvantages are that its ionic conductivity is poorer than that of the solar cell employing the liquid electrolyte (wet solar cell), when a molecular chain of the polymer is long it is difficult to penetrate the electrolyte into pores between the semiconductor nanoparticles, and current density of the solar cell is significantly reduced if the polymer electrolyte insufficiently wraps the semiconductor nanoparticles or is not connected to the semiconductor nanoparticles without a short circuit. Furthermore, in the case of using a liquid-state or wax-state polymer electrolyte having a short molecular chain, mechanical properties of the solar cell are reduced, and an electrolyte leak occurs like the wet solar cell.

SUMMARY OF THE INVENTION

Therefore, the present invention has been made keeping in mind the above disadvantages occurring in the prior arts, and an object of the present invention is to provide a dye-sensitized solar cell, which assures high energy conversion efficiency without an electrolyte leak.

The above object can be accomplished by providing a dye-sensitized solar cell, which includes a photoelectrode, a counter electrode, and an electrolyte interposed between the photoelectrode and counter electrode. In this respect, the electrolyte is a composite polymer electrolyte including a middle molecular substance having a radius of gyration of 6-50 Å and a redox derivative.

Additionally, the electrolyte may further include a polymer mixture with a radius of gyration of 100-1000 Å.

At this time, the middle molecular substance is defined as a substance having a radius of gyration of about 6.0-50.0 Å, and the polymer is defined as a substance having a radius of gyration of 100 Å or more.

Furthermore, the present invention provides a dye-sensitized solar cell, which includes a photoelectrode, a counter electrode, and an electrolyte interposed between the photoelectrode and counter electrode. In this regard, the electrolyte is a composite polymer electrolyte including one selected from the group consisting of middle molecular substances having a radius of gyration of 6-50 Å, or the mixtures of the middle molecular substances having a radius of gyration of 6-50 Å and polymer having a radius of gyration of 100-1000 Å, and the mixtures of the middle molecular substances having a radius of gyration of 6-50 Å and inorganic nanoparticles capable of crosslinking the middle molecular substance and polymer, and redox couples.

As well, the present invention provides a dye-sensitized solar cell employing a composite polymer electrolyte, in which a middle molecular substance has a functional group capable of forming a hydrogen bond or a crosslinking bond and a radius of gyration of 6-50 Å.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, a detailed description will be given of the present invention.

A photoelectrode is coated with semiconductor nanoparticles, to which an organic dye is adsorbed. Each semiconductor nanoparticle, which consists of a nano-sized $TiO_2$ or $SnO_2$ particle, absorbs external light and transfers the light to the organic dye, thereby inducing generation of electrons. The organic dye is excited by light, absorbed into the semiconductor nanoparticles, resulting in the generation of the electrons.

The photoelectrode may be produced according to a typical method known in the art. For example, after a thin blocking layer is coated on a transparent substrate, on which conductive indium-tin oxide (ITO) or fluorine-tin oxide ($SnO_2$:F) is already coated, semiconductor nanoparticles are cast on the substrate in a thickness of 5-10 µm, and the resulting substrate is dipped in an organic dye solution, thereby creating the photoelectrode. The blocking layer coated on the transparent substrate serves to prevent the occurrence of a short circuit between the electrodes. The organic dye solution usually contains ruthenium (Ru).

A counter electrode has a structure in which a platinum layer is coated on a conductive glass substrate, for example, a transparent conductive glass substrate, on which conductive indium-tin oxide or fluorine-tin oxide is coated. The platinum layer is coated on the glass substrate according to sputtering or spin coating methods. The platinum layer of the counter electrode is positioned opposite a semiconductor nanoparticle layer of the photoelectrode. Furthermore, the counter electrode may be exemplified by an electrode, on which platinum and a conductive polymer are sequentially coated. The conductive polymer is selected from the group consisting of poly[2-methoxy-5-(2'-methylhexyloxy)-1,4-phenylenevinylene] (MEH-PPV), polyaniline, polypyrrol, poly(3-tetradecylthiopene) (PTDT), poly(3,4-ethylenedioxythiopene) (PEDOT), and a copolymer thereof.

The counter electrode functions to transfer electrons, which are moved thereto through an external circuit, to a redox derivative.

An electrolyte is any one of a composite polymer electrolyte, which contains a middle molecular substance having a radius of gyration of 6-50 Å and a redox derivative; a composite polymer electrolyte, which contains a mixture of a middle molecular substance having a radius of gyration of 6-50 Å and polymer having a radius of gyration of 100-1000 Å, and a redox derivative; a composite polymer electrolyte, which contains any one selected from the group consisting of a middle molecular substance having a radius of gyration of 6-50 Å, and a mixture of a middle molecular substance having a radius of gyration of 6-50 Å and polymer having a radius of gyration of 100-1000 Å, inorganic nanoparticles capable of crosslinking them, and a redox derivative; and a composite polymer electrolyte, which contains a middle molecular substance having a radius of gyration of 6-50 Å, having functional groups capable of forming hydrogen bonds or crosslinking bonds at both ends thereof, and a redox derivative.

In the present invention, the polymer electrolytes having the same polymer concentration of 1-50 wt % may be used, or the polymer electrolytes having different polymer concentrations may be layered. For example, a polymer electrolyte having a polymer concentration of 1-10 wt %, and a polymer electrolyte having a polymer concentration of 10-50 wt % may be sequentially layered on the photoelectrode to form the electrolyte.

In this respect, the radius of gyration ($R_g$) means a coil size of the polymer electrolyte, and may be expressed by Equation 1 (J. E. Mark et al., Physical Properties of Polymers (2nd ed.), *American Chemical Society*, Washington, 1993). In Equation 1, 0.42 as a constant is an experimental value of polyethylene oxide, and the constant has an intrinsic value depending on the kind of polymer. In Equation 1, Mw denotes the molecular weight of the polymer.

$$R_g(\text{Å})=0.42\sqrt{Mw} \qquad \text{Equation 1}$$

The present invention uses a polymer, having a smaller coil size than each pore of titanium oxide and a semiconductor particle layer, and non-limiting, illustrative examples of the polymer having a radius of gyration of 6.0-50.0 Å include poly(propylene glycol), poly(ethylene glycol), poly(ethylene glycol methylether), poly(ethylene glycol dimethylether), or a copolymer thereof.

A polymer having a radius of gyration of 6.0-50.0 Å reduces crystallinity of the electrolyte because of the small radius of gyration, increases ionic conductivity and smoothly penetrates between semiconductor nanoparticles, resulting in increased current density.

Additionally, functional groups capable of forming a primary bond and a hydrogen bond are introduced to ends of the polymer having a radius of gyration of 6-50 Å, and the resulting polymer may be used to produce the electrolyte.

In this regard, non-limiting, illustrative examples of polymers having a radius of gyration of 100-1000 Å include poly(ethylene oxide) (PEO), poly(propylene oxide) (PPO), poly(ethylene imine) (PEI), poly(ethylene sulphide) (PES), poly(vinylacetate) (PVAc), poly(ethylene succinate) (PESc), poly(methacrylate) (PMA), and poly(acrylate) (PA).

Polymers having a radius of gyration of 100-1000 Å may improve mechanical properties of the electrolyte because of the large radius of gyration.

The inorganic nanoparticles, contributing to the crosslinking bond, may be exemplified by fumed silica ($SiO_2$), but the present invention is not limited to this. The inorganic nanoparticles are crosslinked with the middle molecular substance having a radius of gyration of 6-50 Å or a mixture of the middle molecular substance having a radius of gyration of 6-50 Å and the polymer having a radius of gyration of 100-1000 Å to form a three dimensional network, thereby achieving solidification of the electrolyte.

The polymer having a radius of gyration of 100-1000 Å and the inorganic nanoparticles contain oxygen, nitrogen, or sulfur atoms having unshared electron pairs, and thus, they may form a coordinate bond (complex) with metal cations of the redox derivative. Specifically, the redox derivative in a state of a metal salt is neither dispersed in nor mixed with the electrolyte, but is dissociated into metal cations and anions in the electrolyte. The metal cations interact with the unshared electron pairs to form the coordinate bond, thereby enabling the anions of the redox derivative to freely transfer the electrons. Therefore, the electrolyte according to the present invention does not require a solvent to form dissociated ions participating in generating electricity, and makes movement of the anions, required to initiate a redox reaction in a solid state, possible.

The redox derivative is a functional moiety inducing the redox reaction in the electrolyte. The redox derivative includes a pair of iodide and iodine, or a pair of bromide and bromine. In such a case, the iodide may be exemplified by a metal salt, selected from the group consisting of lithium iodide, sodium iodide, potassium iodide, and cesium iodide, or an imidazolium iodide, selected from the group consisting of 1-methyl-3-propylimidazolium iodide and 1-methyl-2-propylbenzimidazolium iodide. The bromide may be exemplified by a metal salt selected from the group consisting of lithium bromide, sodium bromide, potassium bromide, and cesium bromide. Addition of the redox derivative is conducted in so that a ratio of [—O—]: redox derivative is (10-50):1, and preferably 35:1. At this time, [—O—] is defined as the number of moles of ether groups contained in all polymer chains. The redox derivative initiates the redox reaction using the electrons transferred from the counter electrode, and continuously generates electricity by transferring the electrons to the organic dye in the ground state.

The electrolyte may be produced by mixing the mixture of the middle molecular substance having a radius of gyration of 6-50 Å and polymer having a radius of gyration of 100-1000 Å with the redox derivative. In detail, after the middle molecular substance having a radius of gyration of 6-50 Å and polymer having a radius of gyration of 100-1000 Å are dissolved in an organic solvent, such as acetonitrile, to produce a polymer solution, the polymer solution is mixed with a predetermined amount of redox derivative. At this time, the middle molecular substance having a radius of gyration of 6-50 Å and polymer having a radius of gyration of 100-1000 Å contain atoms providing the unshared electron pairs, and thus, they form coordinate bonds in conjunction with metal cations of an oxidation derivative, thereby forming complexes.

Furthermore, the electrolyte may be produced by mixing the middle molecular substance having a radius of gyration of 6-50 Å or a mixture of the middle molecular substance having a radius of gyration of 6-50 Å and polymer having a radius of gyration of 100-1000 Å, the inorganic nanoparticle capable of crosslinking them, and the redox derivative. In detail, after the middle molecular substance having a radius of gyration of 6-50 Å and inorganic nanoparticles are dissolved in acetonitrile, acting as the solvent, to produce the polymer solution, the polymer solution is mixed with a predetermined amount of redox derivative. In this regard, the middle molecular substance having a radius of gyration of 6-50 Å is crosslinked with the inorganic nanoparticles, thereby being solidified.

As well, the electrolyte may be produced by mixing the middle molecular substance having a radius of gyration of 6-50 Å, which contains functional groups capable of forming hydrogen bonds or crosslinking bonds at both ends thereof, with the redox derivative. In detail, since the middle molecular substance having a radius of gyration of 6-50 Å contains hydroxy groups or carbon-carbon double bonds capable of being crosslinked, it enables the electrolyte to be solidified when a crosslinking agent is added to the middle molecular substance or the middle molecular substance is exposed to ultraviolet rays. Non-limiting, illustrative examples of the crosslinking agent include glutaraldehyde, epichlorohydrin, vinylacrylate, maleic anhydride, formaldehyde, divinylsulfone, toluene diisocyanate, and trimethylol melamine.

A detailed description will be given of the dye-sensitized solar cell according to the present invention, referring to the drawings.

Figure 2:
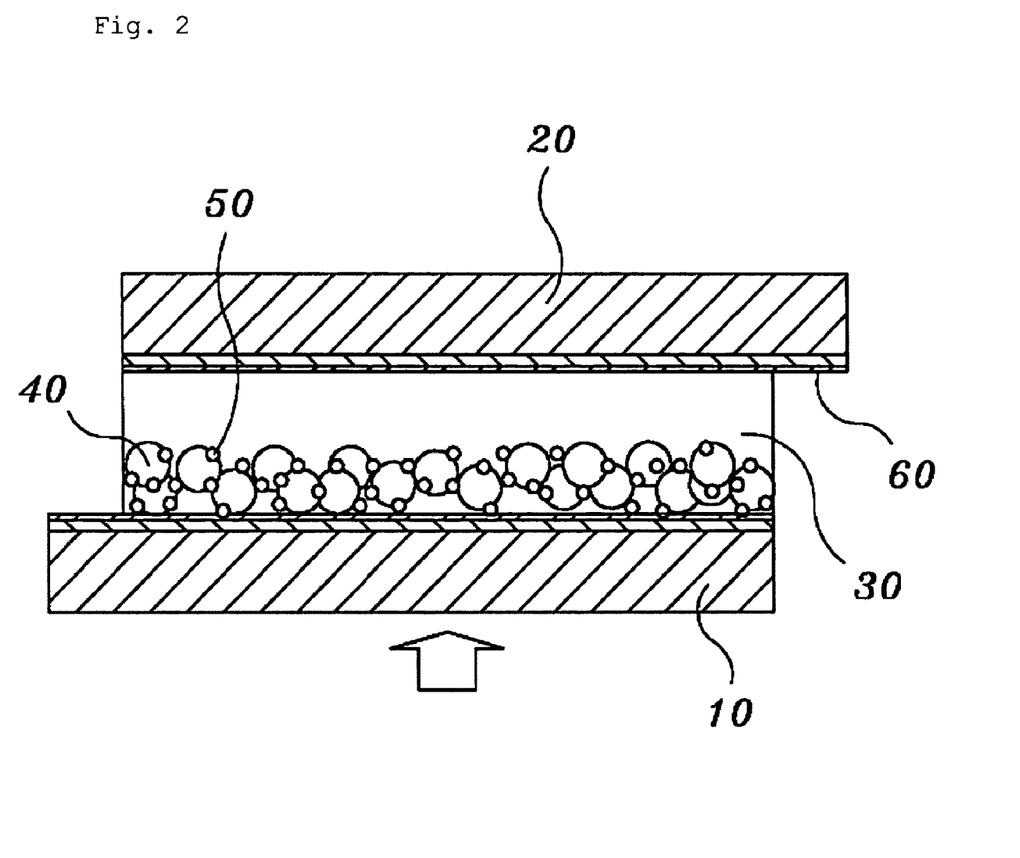
FIG. 2 schematically illustrates a dye-sensitized solar cell according to the present invention.

FIG. 2 illustrates the dye-sensitized solar cell according to the present invention. The dye-sensitized solar cell of the present invention includes a photoelectrode 10, a counter electrode 20, and an electrolyte 30 interposed between them. The photoelectrode 10 is coated with semiconductor nanoparticles 40, to which an organic dye 50 is adsorbed. The counter electrode 20 is coated with platinum 60, and positioned opposite the photoelectrode 10. The electrolyte 30 is interposed between the photoelectrode 10 and counter electrode 20, and contains a middle molecular substance having a radius of gyration of 6-50 Å and a redox derivative; a mixture of a middle molecular substance having a radius of gyration of 6-50 Å with a polymer having a radius of gyration of 100-1000 Å and a redox derivative; or any one selected from the group consisting of a middle molecular substance having a radius of gyration of 6-50 Å, and a mixture of a middle molecular substance having a radius of gyration of 6-50 Å with a polymer having a radius of gyration of 100-1000 Å, inorganic nanoparticles capable of crosslinking them, and a redox derivative (not shown). Alternatively, a middle molecular substance of the electrolyte consists of a middle molecular substance having a radius of gyration of 6-50 Å, having functional groups capable of forming hydrogen bonds or crosslinking bonds at both ends thereof (not shown).

The dye-sensitized solar cell according to the present invention contains the middle molecular substance having a radius of gyration of 6-50 Å and polymer having a radius of gyration of 100-1000 Å mixed with each other in a predetermined mixing ratio, thereby reducing crystallinity of the polymer electrolyte to significantly increase the ionic conductivity, and smoothly penetrating the polymer electrolyte into a titanium oxide layer to improve mechanical properties, resulting in significantly improved energy conversion efficiency. Furthermore, any one of the middle molecular substance having a radius of gyration of 6-50 Å, and a mixture of the middle molecular substance having a radius of gyration of 6-50 Å and polymer having a radius of gyration of 100-1000 Å is mixed with the inorganic nanoparticles capable of crosslinking them, thereby smoothly penetrating the polymer electrolyte into the titanium oxide layer to improve the mechanical properties by solidification of the polymer electrolyte, resulting in significantly improved energy conversion efficiency. Additionally, the middle molecular substances are bonded to each other or the middle molecular substance and crosslinking agent are bonded to each other by the middle molecular substance having a radius of gyration of 6-50 Å, containing functional groups capable of forming the hydrogen bonds or crosslinking bonds at both ends thereof, thereby smoothly penetrating the polymer electrolyte into the titanium oxide layer to improve the mechanical properties by the solidification of the polymer electrolyte, resulting in significantly improved energy conversion efficiency. The dye-sensitized solar cell according to the present invention assures constant energy conversion efficiency despite a vacuum drying day in the course of producing it.

Further, the present invention provides a method of producing the dye-sensitized solar cell.

In detail, the method of producing the dye-sensitized solar cell according to the present invention includes the following steps:

(1) a step of dissolving the middle molecular substance, middle molecular substance and polymer, and any one of the middle molecular substance and a mixture of the middle molecular substance and polymer, constituting the composite polymer electrolyte, and the inorganic nanoparticles in a small amount of solvent to produce a homogeneous solution (step 1), wherein the middle molecular substance may have functional groups capable of forming the hydrogen bonds or crosslinking bonds;

(2) a step of adding the redox derivative to the solution to produce the polymer electrolyte (step 2);

(3) a step of coating the polymer electrolyte on the conductive transparent glass substrate (step 3); and (4) a step of laminating the glass substrate, on which the counter electrode is formed, on the coated polymer electrolyte (step 4).

Step 1

A composition of the composite polymer electrolyte according to the present invention is as follows. In other words, the middle molecular substance having a radius of gyration of 6-50 Å, a mixture of the middle molecular substance having a radius of gyration of 6-50 Å with a polymer having a radius of gyration of 100-1000 Å, or any one of the middle molecular substance having a radius of gyration of 6-50 Å, a mixture of the middle molecular substance having a radius of gyration of 6-50 Å with a polymer having a radius of gyration of 100-1000 Å, and the inorganic nanoparticles capable of crosslinking them are dissolved in the organic solvent, such as acetonitrile, to produce the transparent polymer solution, and the polymer solution is mixed with a predetermined amount of redox derivative to produce the polymer electrolyte. In this regard, the middle molecular substance may contain functional groups capable of forming hydrogen bonds or crosslinking bonds at both ends thereof, and may have the radius of gyration of 6-50 Å.

Step 2

All regarding the redox derivative are the same as the above description. The redox derivative is added to the polymer solution so that a ratio of [—O—]: redox derivative is (10-50):1 to produce a polymer electrolyte solution. Preferably, the redox derivative is added so that the ratio of [—O—]: redox derivative is 35:1. In this respect, [—O—] is defined as the number of moles of ether groups contained in polymer chains. At this time, a halogen compound corresponding to a halogen ion, that is, iodine ($I_2$) must be added in a redox reaction for electronic transition. The halogen compound is added in an amount of 10 wt % based on the redox derivative.

Step 3

In this step, the polymer electrolyte is coated on the conductive transparent glass substrate (photoelectrode), and dried. At this time, the polymer electrolytes having the same polymer concentration may be cast on the photoelectrode once (single layer coating method). Alternatively, the polymer electrolytes having the different polymer concentrations may be sequentially cast on the photoelectrode (multilayer coating method). In detail, in the case of the multilayer coating method, the polymer electrolyte having a polymer concentration of 1-10 wt % and polymer electrolyte having a polymer concentration of 10-50 wt % may be sequentially coated on the photoelectrode.

Step 4

In this step, lamination of the glass substrate, on which the counter substrate is formed, is conducted.

As described above, useful as the counter electrode is the conductive transparent glass substrate, on which only platinum is coated, or the conductive transparent glass substrate, on which platinum and a conductive polymer are sequentially coated. Examples of the conductive polymer are the same as the above description.

Having generally described this invention, a further understanding can be obtained by reference to certain specific examples and experimental examples which are provided herein for purposes of illustration only and are not intended to be limiting unless otherwise specified.

EXAMPLE 1

First Production of a Dye-Sensitized Solar Cell (Single Layer Coating Method)

<Production of a Polymer Electrolyte>

Polyethylene oxide (PEO, $R_g$=420 Å, $T_g$=−67° C., Tm=66° C., Aldrich Co.) and polypropylene glycol (PPG, $R_g$=10 Å, $T_g$=−73° C., $T_m$=66° C., Aldrich Co.) in a predetermined ratio (PEO/PPG=4/6, weight ratio) were dissolved in 9.5 g of acetonitrile to produce a homogeneous and transparent polymer solution (polymer concentration of 5 wt %). Sodium iodide (NaI, Aldrich Co.) was added to the polymer solution so that a molar ratio of [—O—]:[NaI] was 20:1 ([—O—] means the number of moles of ether groups contained in all polymer chains). An amount of added iodine ($I_2$) was fixed to 10 wt % based on sodium iodide. Thereby, the polymer electrolyte was created.

<Production of the Dye-Sensitized Solar Cell>

After the Polymer Electrolyte Having a Polymer concentration of 5 wt % was cast on a photoelectrode, onto which Ru(dcbpy)$_2$(NCS)$_2$ (Ru 535, Solaronix, Switzerland), acting as an organic dye, was adsorbed, acetonitrile acting as a solvent was volatilized for 1 min, and a counter electrode, on which platinum was coated, was laminated. The dye-sensitized solar cell was interposed between two glass substrates, and the glass substrates were clipped using a clip. Subsequently, the resulting structure was dried in a vacuum oven for 5 days or more to remove acetonitrile, acting as the organic solvent, contained in the polymer electrolyte.

EXAMPLE 2

Second Production of the Dye-Sensitized Solar Cell (Multilayer Coating Method)

<Production of a Polymer Electrolyte>

The polymer electrolyte was produced according to the same procedure as example 1.

<Production of the Dye-Sensitized Solar Cell>

After the polymer electrolyte with a polymer concentration of 5 wt % was cast on a photoelectrode, onto which Ru(dcbpy)$_2$(NCS)$_2$ (Ru 535, Solaronix, Switzerland), acting as an organic dye, was adsorbed, and onto a counter electrode, acetonitrile acting as a solvent was volatilized for 1 min. Next, the polymer electrolyte having a polymer concentration of 5 wt % was concentrated to produce a highly concentrated polymer electrolyte having a polymer concentration of 50 wt %. Subsequently, the highly concentrated polymer electrolyte was cast again on the photoelectrode, and the counter electrode was laminated on the resulting photoelectrode. As in example 1, the dye-sensitized solar cell was interposed between two glass substrates, and the glass substrates were clipped using a clip. Subsequently, the resulting structure was dried in a vacuum oven for 5 days or more to remove acetonitrile, acting as the organic solvent, contained in the polymer electrolyte.

EXPERIMENTAL EXAMPLE 1

Polyethylene oxide (PEO, $R_g$=420 Å, $T_g$=-67° C., $T_m$=66° C., Aldrich Co.) and polypropylene glycol (PPG, $R_g$=10 Å, $T_g$=-73° C., $T_m$=66° C., Aldrich Co.) in a predetermined ratio were dissolved in 9.5 g of acetonitrile to produce a homogeneous and transparent polymer solution (polymer concentration of 5 wt %). Sodium iodide (NaI, Aldrich Co.) was added to the polymer solution so that a molar ratio of [—O—]:[NaI] was 20:1. An amount of added iodine (I$_2$) was fixed to 10 wt % based on sodium iodide. Thereby, the polymer electrolyte was created.

The polymer electrolyte solution was coated on a photoelectrode, including a titanium oxide layer, onto which an organic dye was adsorbed, and onto a counter electrode, on which platinum is coated, according to a multilayer coating method, adopting a two-stage coating process, to produce a dye-sensitized solar cell (sample 1). A solvent was completely removed from the solar cell using a vacuum oven for 5 days or more, and an open-circuit voltage ($V_{oc}$), a short-circuit current ($J_{sc}$), a fill factor (FF), and energy conversion efficiency of the solar cell were evaluated at an incidence light condition of 10 mW cm$^{-2}$ using a potentiostat/galvanostat (263A, EG&G Princeton Applied Research, USA) and Xe lamp (50-500 W Xe lamp (Thermo Oriel Instruments, USA)). The open-circuit voltage ($V_{oc}$) is a potential difference formed at both ends of the solar cell when the solar cell is exposed to light while a circuit is opened, that is to say, the solar cell has an infinite impedance. Just for reference, since a maximum value of $V_{oc}$($V_{max}$) depends on a band gap of a semiconductor, a relatively high value of $V_{oc}$ can be gained by use of a material having a high band gap. The short-circuit current ($J_{sc}$) is a current density of the solar cell when the solar cell is exposed to light while a circuit is shorted, that is to say, the solar cell has no external resistance. The short-circuit current depends on the intensity of incident light and wavelength distribution, but after these conditions are fixed, the value depends on how effective electrons, which are excited by light absorption and re-combined with holes without dissipation, are transferred from an inside of the cell to an external circuit. At this time, dissipation caused by re-combination may occur inside a material or at interfaces between materials. The fill factor was calculated using the following Equation 2.

$$FF = \frac{V_{max} \bullet J_{max}}{V_{oc} \bullet J_{sc}} \qquad \text{Equation 2}$$

The fill factor is obtained by dividing the product of current density and voltage ($V_{max} \times J_{max}$) at the maximum power point by the product of $V_{oc}$ and $J_{sc}$. Accordingly, the fill factor may be used as an index indicating how similar a shape of current-voltage (J-V) curve is to a quadrangle when the solar cell is exposed to light.

The energy conversion efficiency (η) was calculated using the following Equation 3.

$$\eta = \frac{V_{max} \bullet J_{max}}{P_\epsilon} \times 100 \qquad \text{Equation 3}$$

The energy conversion efficiency (η) of the solar cell is a ratio of the maximum power generated by the solar cell to incident light energy ($P_{in}$).

The open-circuit voltage, short-circuit current, fill factor, and energy conversion efficiency of the sample 1 were evaluated at the incident light condition of 10 mW/cm$^2$, and the results are described in Table 1.

Another dye-sensitized solar cell (sample 2) was produced according to the same procedure as the case of sample 1 except that polypropylene glycol was not used, and energy conversion efficiency of the dye-sensitized solar cell was evaluated at an incident light condition of 10 mW/cm$^2$. An open-circuit voltage, short-circuit current, fill factor, and energy conversion efficiency were obtained in the same manner as sample 1, and the results are described in Table 1.

TABLE 1

| Electrolyte | $V_{oc}$ (V) | $J_{sc}$ (mA/cm$^2$) | FF (—) | η (%) |
|---|---|---|---|---|
| Sample 1 (PEO/PPG/NaI/I$_2$) | 0.68 | 1.38 | 0.58 | 5.44 |
| Sample 2 (PEO/NaI/I$_2$) | 0.60 | 0.04 | 0.25 | 0.07 |

As shown in Table 1, the composite polymer electrolyte according to the present invention contains polypropylene glycol and polyethylene oxide mixed with each other in a predetermined mixing ratio, thereby reducing crystallinity thereof to significantly increase ionic conductivity, and smoothly penetrating into a titanium oxide layer with tens of nano-sized particles to significantly improve the energy conversion efficiency of the dye-sensitized solar cell.

EXPERIMENTAL EXAMPLE 2

Polyethylene oxide (PEO, $R_g$=420 Å, $T_g$=-67° C., Tm=66° C., Aldrich Co.) and polypropylene glycol (PPG, $R_g$=10 Å, $T_g$=-73° C., $T_m$=66° C., Aldrich Co.) in a predetermined ratio were dissolved in 9.5 g of acetonitrile to produce a homogeneous and transparent polymer solution (polymer concentration of 5 wt %). Lithium iodide (LiI, Aldrich Co.) was added to the polymer solution so that a molar ratio of [—O—]:[LiI] was 20:1. An amount of added iodine (12) was fixed to 10 wt % based on lithium iodide. Thereby, the polymer electrolyte was created.

A dye-sensitized solar cell (sample 3) was produced according to the same procedure as in experimental example 1, and an open-circuit voltage, a short-circuit current, a fill factor, and an energy conversion efficiency were obtained in the same manner as experimental example 1. The results are described in Table 2.

Other dye-sensitized solar cells (samples 4, 5, and 6) were produced according to the same procedure as in sample 3 except that sodium iodide (NaI), potassium iodide (KI), and 1-methyl-2-propylbenzimidazolium iodide (BI) were used instead of lithium iodide, and open-circuit voltages, short-circuit currents, fill factors, and energy conversion efficiencies (incident light conditions of 100 mW/cm$^2$ and 10 mW/cm$^2$) were obtained in the same manner as sample 3. The results are described in Table 2.

TABLE 2

| Electrolyte | $V_{oc}^a$ (V) | $J_{sc}^a$ (mA/cm$^2$) | FF$^a$ (−) | $\eta^a$ (%) | $\eta^b$ (%) |
|---|---|---|---|---|---|
| Sample 3 (PEO/PPG/LiI/I$_2$) | 0.65 | 1.31 | 0.59 | 5.05 | 2.81 |
| Sample 4 (PEO/PPG/NaI/I$_2$) | 0.68 | 1.38 | 0.58 | 5.40 | 3.13 |
| Sample 5 (PEO/PPG/KI/I$_2$) | 0.73 | 1.28 | 0.70 | 6.70 | 3.50 |
| Sample 6 (PEO/PPG/BI/I$_2$) | 0.74 | 1.48 | 0.68 | 7.20 | 4.10 |

$\eta^a$: energy conversion efficiency evaluated at 10 mW/cm$^2$
$\eta^b$: energy conversion efficiency evaluated at 100 mW/cm$^2$ As shown in Table 2, larger metal cations of a polymer electrolyte solution bring about more polymer-metal salt complexes, resulting in relatively increased mobility of I$^-$ and I$_3^-$ ions, thereby increasing the energy conversion efficiency. Additionally, when BI, which was an ionic material existing in a liquid phase at room temperature, was added to the polymer electrolyte solution, the energy conversion efficiency was increased in comparison with other redox derivatives.

EXPERIMENTAL EXAMPLE 3

The dye-sensitized solar cell corresponding to sample 5 of experimental example 2 was produced according to the same procedure as in experimental example 2, and energy conversion efficiency (incident light condition of 10 mW/cm$^2$), depending on a vacuum drying day in the course of drying the dye-sensitized solar cell in a vacuum oven, was evaluated in the same manner as experimental example 1.

Figure 3:
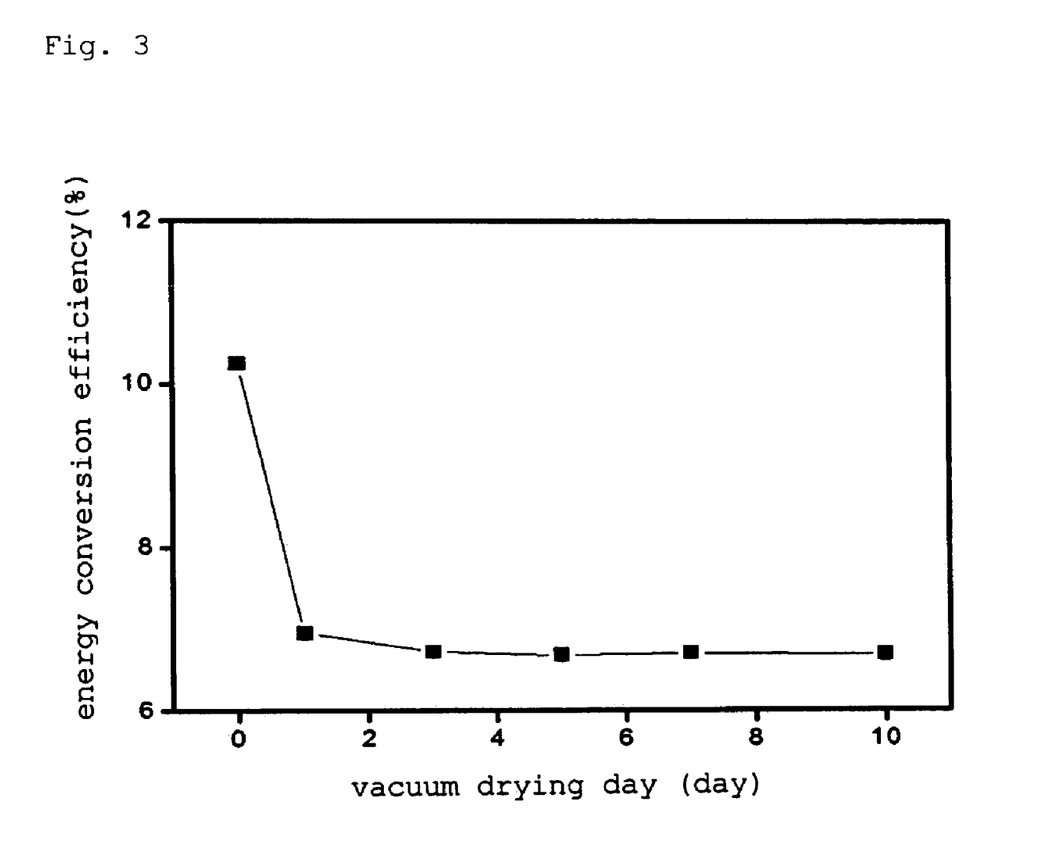
FIG. 3 is a graph showing energy conversion efficiency as a function of a vacuum drying day for the dye-sensitized solar cell according to the present invention.

The results are plotted in FIG. 3.

As shown in FIG. 3, it can be seen that when a vacuum drying time is one day, a solvent is completely removed from a polymer electrolyte. Furthermore, after the drying was maintained for about one day, the energy conversion efficiency is constantly maintained regardless of the vacuum drying time.

EXPERIMENTAL EXAMPLE 4

A dye-sensitized solar cell corresponding to sample 5 of experimental example 2 was produced according to the same procedure as in experimental example 2. In this respect, solar cells were produced according to a single layer coating method, in which coating of a polymer electrolyte solution was conducted once, and according to a multilayer coating method, in which the polymer electrolyte solution was coated on a photoelectrode and a counter electrode.

Subsequently, open-circuit voltages, short-circuit currents, fill factors, and energy conversion efficiencies were evaluated at an incident light condition of 10 mW/cm$^2$ according to the same manner as the case of experimental example 1. The results are described in Table 3.

TABLE 3

| Electrolyte | $V_{oc}$ (V) | $J_{sc}$ (mA/cm$^2$) | FF (−) | $\eta$ (%) |
|---|---|---|---|---|
| Sample 5 (PEO/PPG/KI/I$_2$) - single layer coating method | 0.64 | 1.10 | 0.41 | 3.39 |
| Sample 5 (PEO/PPG/KI/I$_2$) - multilayer coating method | 0.73 | 1.28 | 0.70 | 6.70 |

As shown in Table 3, when the dye-sensitized solar cell was produced according to the multilayer coating method, energy conversion efficiency was improved.

EXPERIMENTAL EXAMPLE 5

Poly(ethylene glycol dimethylether) (PEGDME, $R_g$=10 Å, $M_n$=500 g/mol, Aldrich Co.) and 9 wt % of fumed silica (99.8%, Aldrich Co.) in a predetermined ratio were dissolved in 2.0 g of acetonitrile (99.9%, Aldrich Co.) to produce a homogeneous and transparent polymer solution (polymer concentration of 25 wt %). Potassium iodide (KI, 99.998%, Aldrich Co.) was added to the polymer solution so that a molar ratio of [—O—]:[KI] was 20:1. An amount of added iodine (I$_2$) was fixed to 10 wt % based on potassium iodide. Thereby, a polymer electrolyte was created.

The polymer electrolyte solution was coated on a photoelectrode, including a titanium oxide layer, onto which an organic dye was adsorbed, and a counter electrode, on which platinum was coated, according to a multilayer coating method, adopting a two-stage coating process, to produce a dye-sensitized solar cell (sample 7). A solvent was completely removed from the solar cell using a vacuum oven for 5 days or more, and an open-circuit voltage, a short-circuit current, a fill factor, and an energy conversion efficiency were evaluated in the same manner as experimental example 1. The results are described in Table 4.

Additionally, another dye-sensitized solar cell (sample 8) was produced according to the same procedure as in sample 7 except that 12 wt % of fumed silica was used, and an open-circuit voltage, a short-circuit current, a fill factor, and an energy conversion efficiency were obtained in the same manner as experimental example 1. The results are described in Table 4.

Another dye-sensitized solar cell (sample 9) was produced according to the same procedure as the case of sample 7 except that 1-methyl-3-propylimidazolium iodide (MPII, Solaronix) was used instead of potassium iodide, and that 12 wt % of fumed silica was used, and an open-circuit voltage, a short-circuit current, a fill factor, and an energy conversion efficiency (incident light conditions of 100 mW/cm$^2$ and 10 mW/cm$^2$) were obtained in the same manner as sample 7. The results are described in Table 4.

Another dye-sensitized solar cell (sample 10) was produced according to the same procedure as in sample 7 except that polyethylene oxide (PEO, $R_g$=420 Å, $T_g$=−67° C., $T_m$=66° C., Aldrich Co.) as a polymer and poly(ethylene glycol dimethylether) (PEGDME, $R_g$=10 Å, $M_n$=500 g/mol, Aldrich Co.) as a middle molecular substance were mixed with each other in a weight ratio of 4/6, and that 12 wt % of fumed silica was used, and an open-circuit voltage, a short-circuit current, a fill factor, and an energy conversion efficiency (incident light conditions of 100 mW/cm$^2$ and 10 mW/cm$^2$) were obtained in the same manner as sample 7. The results are described in Table 4.

TABLE 4

| Electrolyte | $V_{oc}{}^a$ (V) | $J_{sc}{}^a$ (mA/cm$^2$) | FF$^a$ (-) | $\eta^a$ (%) | $\eta^b$ (%) |
|---|---|---|---|---|---|
| Sample 7 (PEGDME/SiO$_2$(9%)/KI/I$_2$) | 0.68 | 8.12 | 0.58 | 3.20 | 6.10 |
| Sample 8 (PEGDME/SiO$_2$(12%)/KI/I$_2$) | 0.66 | 6.21 | 0.58 | 2.38 | 4.91 |
| Sample 9 (PEGDME/SiO$_2$(12%)/MPII/I$_2$) | 0.63 | 5.43 | 0.59 | 2.02 | 4.44 |
| Sample 10 (PEO/PEGDME/SiO$_2$(12%)/MPII/I$_2$) | 0.64 | 5.21 | 0.58 | 1.98 | 4.31 |

$\eta^a$: energy conversion efficiency evaluated at 10 mW/cm$^2$
$\eta^b$: energy conversion efficiency evaluated at 100 mW/cm$^2$ As shown in Table 4, a composite polymer electrolyte according to the present invention contains polymer having a radius of gyration of 10 Å or less and fumed silica, mixed with each other, thereby forming the solid state polymer electrolyte having a large molecular weight after a solvent is volatilized, and thus, it smoothly permeates into a titanium oxide layer with a particle size of tens of nanometers, resulting in increased energy conversion efficiency of the dye-sensitized solar cell. As well, the polymer is added in a predetermined ratio to a mixture of the middle molecular substance and fumed silica, thereby simultaneously maintaining the energy conversion efficiency and improving the mechanical properties of the polymer electrolyte.

EXPERIMENTAL EXAMPLE 6

0.2 g of polyethylene oxide (PEO, $R_g$=420 Å, $T_g$=-67° C., $T_m$=66° C., Aldrich Co.) was dissolved in 3 g of acetonitrile to produce a homogeneous and transparent polymer solution (polymer concentration of 6.25 wt %). Sodium iodide (NaI, Aldrich Co.) was added to the polymer solution so that a molar ratio of [—O—]:[NaI] was 20:1. An amount of added iodine (I$_2$) was fixed to 10 wt % based on sodium iodide. Thereby, a polymer electrolyte was created.

A dye-sensitized solar cell (sample 11) was produced according to the same procedure as experimental example 1, and an open-circuit voltage, a short-circuit current, a fill factor, and an energy conversion efficiency (incident light condition of 10 mW/cm$^2$) were obtained in the same manner as experimental example 1. The results are described in Table 5.

Another dye-sensitized solar cell (sample 12) was produced according to the same procedure as the case of the sample 11 except that polyethylene oxide (PHB, $R_g$=10 Å, $T_g$=-12° C., $T_m$=42° C.), having hydrogen bond functional groups at both ends thereof formed through a synthesis process, was used instead of polyethylene oxide, and an open-circuit voltage, a short-circuit current, a fill factor, and an energy conversion efficiency (incident light condition of 10 mW/cm$^2$) were obtained in the same manner as sample 11. The results are described in Table 5.

TABLE 5

| Electrolyte | $V_{co}$ (V) | $J_{sc}$ (mA/cm$^2$) | FF (-) | $\eta$ (%) |
|---|---|---|---|---|
| Sample 11 (PEO/NaI/I$_2$) | 0.60 | 0.04 | 0.25 | 0.07 |
| Sample 12 (PHB/NaI/I$_2$) | 0.53 | 1.00 | 0.64 | 3.43 |

As shown in Table 5, the polymer electrolyte, formed by the hydrogen bond of PHB according to the present invention more smoothly permeates into a semiconductor nanoparticle layer and has improved mechanical properties in comparison with other kinds of polymer electrolytes having no hydrogen bond, resulting in significantly increased energy conversion efficiency of the dye-sensitized solar cell.

EXPERIMENTAL EXAMPLE 7

Polyethylene oxide (PEO, $R_g$=13 Å, $T_g$=-67° C., $T_m$=66° C., Aldrich Co.) and glutaraldehyde as a crosslinking agent (GA, Aldrich Co.) in a predetermined ratio were dissolved in 9.5 g of acetonitrile to produce a homogeneous and transparent polymer solution (polymer concentration of 5 wt %). 0.1 M hydrochloric acid as a crosslinking catalyst was added in a small amount to the polymer solution. Potassium iodide (KI, Aldrich Co.) was added to the polymer solution so that molar ratios of [—O—]:[KI] were 50:1, 35:1, 25:1, and 10:1. An amount of added iodine (I$_2$) was fixed to 10 wt % based on potassium iodide. Thereby, a polymer electrolyte solution was created.

A dye-sensitized solar cell was produced according to the same procedure as experimental example 1, and open-circuit voltages, short-circuit currents, fill factors, and energy conversion efficiencies (incident light conditions of 100 mW/cm$^2$ and 10 mW/cm$^2$) were obtained in the same manner as experimental example 1. The results are described in Table 6.

TABLE 6

| Electrolyte | | [—O—]:[KI] | $V_{oc}{}^a$ (V) | $J_{sc}{}^a$ (mA/cm$^2$) | FF$^a$ (-) | $\eta^a$ (%) | $\eta^b$ (%) |
|---|---|---|---|---|---|---|---|
| (PEO/GA/HCl/KI/I$_2$) | Sample 13 | 50:1 | 0.55 | 2.18 | 0.48 | 5.76 | 1.81 |
| | Sample 14 | 35:1 | 0.56 | 3.00 | 0.51 | 8.56 | 2.27 |
| | Sample 15 | 25:1 | 0.54 | 2.11 | 0.52 | 5.92 | 1.93 |
| | Sample 16 | 10:1 | 0.34 | 1.61 | 0.59 | 3.20 | 1.07 |

$\eta^a$: energy conversion efficiency evaluated at 10 mW/cm$^2$
$\eta^b$: energy conversion efficiency evaluated at 100 mW/cm$^2$ As shown in Table 6, mechanical strength of the dye-sensitized solar cell is constantly maintained and a polymer electrolyte smoothly permeates into a semiconductor nanoparticle layer because of crosslinking of a middle molecular substance having a radius of gyration of 50 Å or less according to the present invention, resulting in significantly increased energy conversion efficiency of the dye-sensitized solar cell. Additionally, in the case of a polyethylene/glutaraldehyde electrolyte, the energy conversion efficiency was highest when potassium iodide was added to the electrolyte so that a ratio of [—O—]: [KI] was 35:1.

EXPERIMENTAL EXAMPLE 8

Like experimental examples 1 and 2, polyethylene oxide (PEO, $R_g$=420 Å, $T_g$=−67° C., $T_m$=66° C., Aldrich Co.) and polypropylene glycol (PPG, $R_g$=10 Å, $T_g$=−73° C., $T_m$=66° C., Aldrich Co.) in a predetermined ratio were dissolved in 9.5 g of acetonitrile to produce a homogeneous and transparent polymer solution (polymer concentration of 5 wt %). Potassium iodide (KI, Aldrich Co.) was added to the polymer solution so that a molar ratio of [—O—]: [KI] was 50:1. An amount of added iodine ($I_2$) was fixed to 10 wt % based on potassium iodide. A dye-sensitized solar cell was produced using the polymer electrolyte according to the multilayer coating method as described in experimental example 4. In this experimental example, poly[2-methoxy-5-(2'-ethylhexyloxy)-1,4-phenylenevinylene] (MEH-PPV), acting as a conductive polymer, was mixed with polyethylene oxide (PEO, $R_g$=420 Å, $T_g$=−67° C., $T_m$=66° C., Aldrich Co.) in a weight ratio of 1:1, 0.1 wt % of mixture was dissolved in a mixed organic solvent (methanol:tetrahydrofuran (8:2, weight ratio)), and the resulting solution was coated according to a spin coating process on a counter electrode coated with platinum (sample 17). Subsequently, a counter electrode coated with MEH-PPV/PEO/Pt was left under an iodine ($I_2$) atmosphere for 20 min to produce an iodine-doped counter electrode.

For comparison, a dye-sensitized solar cell was produced using the counter electrode coated with platinum (sample 18).

The dye-sensitized solar cells were produced according to the same procedure as experimental examples 1 and 2 (multilayer coating method), and open-circuit voltages, short-circuit currents, fill factors, and energy conversion efficiencies were obtained in the same manner as experimental example 1 at an incident light condition of 100 mW/cm². The results are described in Table 7.

TABLE 7

| Electrolyte | $V_{oc}$ (V) | $J_{sc}$ (mA/cm²) | FF (−) | η (%) |
|---|---|---|---|---|
| Sample 17 (PEO/PPG/KI/$I_2$) | 0.76 | 7.71 | 0.66 | 3.84 |
| Sample 18 (PEO/PPG/KI/$I_2$) | 0.79 | 4.66 | 0.73 | 2.70 |

As shown in Table 7, in the case of using the counter electrode on which platinum and the iodine-doped conductive polymer are sequentially coated (sample 17), the energy conversion efficiency was significantly increased in comparison with the case of using the counter electrode on which only platinum was coated.

As described above, a dye-sensitized solar cell according to the present invention is advantageous in that polymers with different radii of gyration are mixed with each other in a predetermined ratio, thereby reducing crystallinity of a polymer electrolyte to significantly increase ionic conductivity, and smoothly penetrating the polymer electrolyte into a titanium oxide layer to improve mechanical properties, resulting in significantly improved energy conversion efficiency. Another advantage is that the dye-sensitized solar cell assures constant energy conversion efficiency regardless of a vacuum drying day.

Therefore, the dye-sensitized solar cell according to the present invention assures high energy conversion efficiency without an electrolyte leak, and thus, it can be stably and practically used for a long time.

What is claimed is:

1. A dye-sensitized solar cell, comprising:
   a photoelectrode;
   a counter electrode; and
   an electrolyte sandwiched between the photoelectrode and counter electrode,
   wherein, the electrolyte is a composite polymer electrolyte selected from the group consisting of:
   (a) a mixture of a middle molecular substance having a radius of gyration of 10-13 Å with a polymer having a radius of gyration of 100-1000 Å;
   (b) a mixture of a middle molecular substance having a radius of gyration of 10-13 Å with inorganic nanoparticles capable of solidifying the middle molecular substance;
   (c) a mixture of a middle molecular substance having a radius of gyration of 10-13 Å with a polymer having a radius of gyration of 100-1000 Å and inorganic nanoparticles capable of solidifying the middle molecular substance;
   (d) a middle molecular substance having a radius of gyration of 10-13 Å having functional groups capable of forming hydrogen bonds or crosslinking bonds at both ends thereof; and
   redox couples;
   wherein the middle molecular substance having the radius of gyration of 10-13 Å is selected from a group consisting of poly(propylene glycol), poly(ethylene glycol), poly(ethylene glycol methylether), poly(ethylene glycol dimethylether), and a copolymer thereof.

2. The dye-sensitized solar cell as set forth in claim 1, wherein the composite polymer electrolyte comprises:
   a middle molecular substance having a radius of gyration of 10-13 Å having carbon-carbon double bonds capable of forming crosslinking bonds when being exposed to ultraviolet rays at both ends and redox couples; or
   a middle molecular substance having a radius of gyration of 10-13 Å having hydroxy groups capable of forming crosslinking bonds at both ends, a crosslinking agent having the functional groups capable of being crosslinked, selected from a group consisting of glutaraldehyde, epichlorohydrin, vinylacrylate, maleic anhydride, formaldehyde, divinylsulfone, toluene diisocyanate, and trimethylol melamine and redox couples.

3. The dye-sensitized solar cell as set forth in claim 1, wherein the polymer having the radius of gyration of 100-1000 Å is selected from a group consisting of poly(ethylene oxide), poly(propylene oxide), poly(ethylene imine), poly(ethylene sulphide), poly(vinyl acetate), poly(ethylene succinate), poly(methacrylate), and poly(acrylate).

4. The dye-sensitized solar cell as set forth in claim 1, wherein the inorganic nanoparticles are silica.

5. The dye-sensitized solar cell as set forth in claim 1, wherein the redox derivative includes a pair of iodide and iodine, or a pair of bromide and bromine.

6. The dye-sensitized solar cell as set forth in claim 5, wherein the iodide is derived from a metal salt, selected from a group consisting of lithium iodide, sodium iodide, potassium iodide, and cesium iodide, or an imidazolium iodide, selected from a group consisting of 1-methyl-3-propylimidazolium iodide and 1-methyl-2-propylbenzimidazolium iodide, and the bromide is derived from a metal salt selected from a group consisting of lithium bromide, sodium bromide, potassium bromide, and cesium bromide.

7. A dye-sensitized solar cell, comprising:
a photoelectrode comprising a layer of semiconductor nanoparticles having a dye thereon and pores between the semiconductor nanoparticles;
a counter electrode; and
an electrolyte positioned between the photoelectrode and the counter electrode,
wherein the electrolyte comprises a composite polymer electrolyte, the composite polymer electrolyte comprising a polymer having a coil size of a diameter that is less than the diameter of the pores of the semiconductor nanoparticles, whereby the polymer comprises a middle molecular substance having a radius of gyration of 10-13 Å selected from a group consisting of poly(propylene glycol), poly(ethylene glycol), poly(ethylene glycol methylether), poly(ethylene glycol dimethylether), and a copolymer thereof and penetrates into the pores formed between the semiconductor nanoparticles and one or more redox derivatives.

8. The dye-sensitized solar cell of claim 7, wherein the electrolyte further comprises one or more inorganic nanoparticles for cross-linking and solidifying the polymer electrolyte.

9. The dye-sensitized solar cell of claim 8, wherein the inorganic nanoparticles comprise silica.

10. The dye-sensitized solar cell of claim 7, wherein the polymer comprises a middle molecular substance having hydroxy groups capable of forming crosslinking bonds at both ends thereof and the electrolyte further comprises one or more a cross-linking agents selected from a group consisting of glutaraldehyde, epichlorohydrin, vinylacrylate, maleic anhydride, formaldehyde, divinylsulfone, toluene diisocyanate, and trimethylol melamine.

11. The dye-sensitized solar cell of claim 7, wherein the polymer electrolyte further comprises a polymer having a radius of gyration of 100-1000 Å.

12. The dye-sensitized solar cell of claim 11, wherein the polymer having a radius of gyration of 100-1000 Å comprises one or more of poly(ethylene oxide), poly(propylene oxide), poly(ethylene imine), poly(ethylene sulphide), poly(vinyl acetate), poly(ethylene succinate), poly(methacrylate), and poly(acrylate).

13. The dye-sensitized solar cell of claim 7, wherein the redox derivative includes a pair of iodide and iodine, or a pair of bromide and bromine.

14. The dye-sensitized solar cell of claim 7, wherein the polymer comprises a middle molecular substance having functional groups capable of forming hydrogen bonds at both ends thereof.

15. The dye-sensitized solar cell of claim 7, wherein the polymer comprises a middle molecular substance having carbon-carbon double bonds capable of forming crosslinking bonds when exposed to ultra violet rays at both ends thereof and the electrolyte further comprises one or more cross-linking agents selected from a group consisting of glutaraldehyde, epichlorohydrin, vinylacrylate, maleic anhydride, formaldehyde, divinylsulfone, toluene, diisocyanate, and trimethylol melamine.

16. The dye-sensitized solar cell of claim 1, wherein the counterelectrode comprises a layer of iodine-doped conductive polymer over platinum layer.

17. The dye-sensitized solar cell of claim 11, wherein the electrolyte further comprises one or more inorganic nanoparticles for cross-linking and solidifying the polymer electrolyte.

* * * * *